United States Patent [19]

Itabashi et al.

[11] Patent Number: 4,461,631
[45] Date of Patent: Jul. 24, 1984

[54] ZEOLITE ENCAPSULATING MATERIAL

[75] Inventors: Keiji Itabashi, Sagamihara; Satoru Morishita, Kodaira; Hisashi Hatotani, Tokyo, all of Japan

[73] Assignee: Toyo Soda Manufacturing Co., Ltd., Shin-nanyo, Japan

[21] Appl. No.: 392,698

[22] Filed: Jun. 28, 1982

Related U.S. Application Data

[63] Continuation of Ser. No. 188,952, Sep. 19, 1980, abandoned.

[30] Foreign Application Priority Data

Sep. 20, 1979 [JP] Japan .................. 54-120131

[51] Int. Cl.$^3$ .......................................... B01D 53/04
[52] U.S. Cl. .......................................... 55/66; 55/75
[58] Field of Search ........................... 55/66, 75, 389; 252/455 Z; 423/328

[56] References Cited

U.S. PATENT DOCUMENTS

| | | | |
|---|---|---|---|
| 2,882,243 | 4/1959 | Milton | 55/75 X |
| 3,065,054 | 11/1962 | Haden, Jr. et al. | 252/455 Z X |
| 3,078,645 | 2/1963 | Milton | 55/75 |
| 3,316,691 | 5/1967 | Sesny et al. | 55/66 |
| 3,322,690 | 5/1967 | Bilisoly | 252/455 Z |
| 3,375,065 | 3/1968 | McDaniel et al. | 252/455 Z X |
| 3,785,122 | 1/1974 | Yatsurugi et al. | 55/75 |

OTHER PUBLICATIONS

Breck, Zeolite Molecular Sieves, Structure, Chemistry, and Use, 1974, pp. 490-498, 623-628 and 633-645.
Meier et al., Molecular Sieves, Advances in Chemistry Series 121, 1973, pp. 87-95.

Primary Examiner—Robert H. Spitzer
Attorney, Agent, or Firm—Armstrong, Nikaido, Marmelstein & Kubovcik

[57] ABSTRACT

A zeolite occluding material composed of an A-type zeolite expressed by a generic formula $(K_x M_y Na_z)(AlO_2.SiO_2)_{12}.(NaAlO_2)\delta.\omega H_2O$ wherein M represents a bivalent metal; $0 \leq \delta \leq 1$; and $\omega$ represents a positive number. Further, in the above stated unit cell, x, y and z which respectively represent the numbers of K, M and Na within the unit crystal lattice (or unit crystal cell) are in a relation:

$x + 2y + z = 12$ $3 \leq x < 10$ $1 < y \leq 4.5$.

2 Claims, 1 Drawing Figure

ZEOLITE ENCAPSULATING MATERIAL

This is a continuation of application Ser. No. 188,952, filed Sept. 19, 1980, now abandoned.

BACKGROUND OF THE INVENTION

This invention relates to an improved zeolite occluding material.

Zeolite is one of adsorbents that are at present widely in use for various purposes including industrial purposes. The zeolite, particularly A type zeolite, is typically represented by a sodium-A zeolite, which is expressed by a typical unit cell of $Na_{12}(AlO_2.SiO_2)_{12}$. $(NaAlO_2)\delta.\omega H_2O$, wherein $0 \leq \delta \leq 1$ and $\omega$ represents a positive number. In this unit cell, 12 sodium ions are ion exchangeable for other metal ions. The kinds of the exchange ions and the rate of exchange is determined by the effective adsorption pore diameter. However, the size of the effective adsorption pore diameter is in close relation to the crystal structure, the size of the ion species to be exchanged and the position selecting property thereof within a unit crystal lattice. In other words, among the 12 cations (sodium ions) which are exchangeable within the unit crystal lattice of zeolite, three ions are located on the face of an eight-member oxygen ring where the molecule to be adsorbed comes in and goes out and eight ions are on the face of a six-member oxygen ring while the remaining one is located on the face of a four-member oxygen ring.

Therefore, it is the size of the cations on the face of the eight-member oxygen ring that have an influence directly on the adsorbing property of the zeolite. Where a sodium A-type zeolite is employed as starting matter and the sodium ions of the zeolite are exchanged for potassium ions, the potassium ions have a preference for entering the positions on the face of the eight-member oxygen ring. The effective adsorption pore diameter of the sodium A-type zeolite is 4 Å. When the potassium ions which are larger than sodium ions enter the positions, the effective adsorption pore diameter of the ion-exchanged zeolite becomes 3 Å.

If the ion exchange is carried out for calcium ions, calcium ions have a preference for entering the positions on the face of the six-member oxygen ring while, among the sodium ions that are to move out to keep the balance of charges, the sodium ions on the face of the eight-member oxygen ring have priority over other sodium ions in moving out. Therefore, when an ion-exchange process is carried out until all of the sodium ions disappear from the face of the eight-member oxygen ring, the effective adsorption pore diameter of the zeolite used in the ion-exchange increases and becomes 5 Å.

Generally, the effective adsorption pore diameter of zeolite or that of zeolite obtained through ion-exchange is nearly uniform. A molecule smaller than the effective adsorption pore diameter of the zeolite can be adsorbed by the zeolite. However, a molecule larger than that cannot be adsorbed by the zeolite through a normal process.

The position selecting property of the ion to be exchanged with the exchangeable ion contained in the zeolite and variation that takes place in adsorbing property with variation in combination of the species of ions have not been clearly known. The present inventors conducted researches into the details of these relations. As a result of these researches, it has been discovered that a zeolite having a novel adsorbing property which has hitherto been unknown can be obtained through an ion exchange process for reformation of zeolite in terms of the adsorbing power thereof carried out with the combination of ion species and the rate of exchange suitably selected. In other words, it has been discovered that, in having the exchangeable sodium ions of a sodium type zeolite gradually exchanged for calcium ions, when two or more than two calcium ions enter, sodium ions on the face of the eight-member oxygen ring move out and this makes the effective adsorbing pore diameter 5 Å.

On the other hand, in case where the potassium ions of a potassium type zeolite, which is obtained by exchanging the exchangeable sodium ions of a sodium type zeolite with potassium ions, or those of a potassium type zeolite obtained with a source of potassium used as material, are processed to have them gradually exchanged for bivalent metal ions, the bivalent metal ions have preference to come onto a six-member oxygen ring face. However, when the number of the bivalent metal ions is less than 4.5 per unit crystal lattice, the potassium ions on the face of the eight-member oxygen ring are not removed from there and thus the effective adsorbing pore diameter is kept at 3 Å.

It has been found that, in the case of zeolite in which the effective adsorbing pore diameter is 3 Å with potassium ions on the face of the eight-member oxygen ring and bivalent metal ions on a part of the six-member oxygen ring face as stated in the foregoing, a molecule of diameter larger than the effective adsorbing pore diameter can be adsorbed to the zeolite at a relatively low temperature and at a low pressure; and that the adsorbed molecule will not be desorbed even when the zeolite is brought back into ordinary desorbing condition. Namely, the zeolite has an occluding property. This indicates that the potassium ions on the face of the eight-member oxygen ring are made to be readily movable by the influence of the bivalent ions received in exchange. Such a movable state of the potassium ions on the face of the eight-member oxygen ring is believed to be dependent upon the number of the exchanged bivalent metal ions on the face of the six-member oxygen ring as well as temperature. Therefore, the molecule which is occluded in the zeolite can be released from an occluded state by raising the temperature of the zeolite. It is also possible that the occluding quantity and adsorbing and desorbing temperature can be adjusted by varying the number of the bivalent metal ions to be exchanged. In a practical application, the exchangeable cations of the zeolite do not have to be limited to potassium and bivalent metal ions but it is also permissible to have sodium ions on a part of the face of the six-member oxygen ring.

SUMMARY OF THE INVENTION

It is a general object of the invention to provide the above stated zeolite occluding material which is manufactured in the following manner: The sodium type zeolite which is to be used for ion-exchange is obtained by an ordinary known method, for example, by a hydrothermal crystallizing process with sources of silica, alumina and sodium employed. Further, the ion-exchange between the sodium ions of the sodium type zeolite and the potassium ions is carried out in accordance with an ordinary known method by immersing the sodium type zeolite in a solution containing the potassium ions. The ratio of the ion-exchange between the sodium ions and the potassium ions is approximately set by allowing at least three potassium ions to be present per unit lattice of the zeolite. It is also possible to use a potassium type zeolite which is obtained by using a source of potassium from the beginning without having recourse to ion-exchange. The potassium type zeolite thus obtained is subjected to ion-exchange for bivalent metal ions. The divalent metal ions usable in accordance with the present invention are selected out of a group consisting of the bivalent ions of metals belonging to the second group shown in the periodic table such as magnesium, calcium, strontium, zinc, cadmium and mercury; and the bivalent ions of transition metals such as manganese, cobalt and iron. The ion-exchange between the potassium type zeolite and the above stated bivalent metal ions is carried out in an ordinary known method by immersing the potassium-A zeolite in a solution containing these bivalent metal ions. The composition of a zeolite which is obtained by having most of the sodium contained in a sodium-A zeolite ion-exchanged for potassium to change it into a potassium-A zeolite and by having this potassium-A zeolite further ion-exchanged for the divalent metal ions with sodium-A zeolite is as shown below:

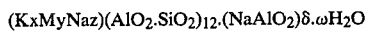

$$(K_xM_yNa_z)(AlO_2 \cdot SiO_2)_{12} \cdot (NaAlO_2)_\delta \cdot \omega H_2O$$

wherein M represents the bivalent metal; $0 \leq \delta \leq 1$; and $\omega$ represents a positive number. In the present invention, the y which represents in the above formula the number of the bivalent metal ions contained per the unit crystal lattice of the zeolite is a factor which governs the properties of the zeolite as an occluding material. In accordance with the invention, x, y and z shown in the above formulas are in the following relation:

$$x + 2y + z = 12, \quad 3 \leq x < 10, \quad 1 < y \leq 4.5.$$

The invention is not limited to the method of effecting ion-exchange for the bivalent metal ions after the exchangeable cation contained in the sodium type zeolite is exchanged for the potassium ion. In addition to this method, it is also possible either to carry out the two processes of ion-exchange simultaneously by using a solution containing the potassium ions and the bivalent metal ions or to carry out the ion-exchange for the potassium ions after carrying out the exchange for the bivalent metal ions. For the ion-exchange, an aqueous solution of a metal halide (particularly chloride), nitrate, sulfate and hydroxide is employed and the concentration thereof is suitably determined according to the quantity of the zeolite to be used for the exchange, the purpose, the rate of exchange, etc.

To ensure the uniformity and reproducibility of properties of the zeolite occluding material obtained in accordance with the invention, it is preferable that ion-exchange equilibrium is thoroughly reached in effecting the ion-exchange. Although the ion-exchange can be effected at a normal temperature, the exchange process is preferably carried out at a temperature around 80° C. for a period of at least 0.5 hour. The zeolite which has undergone the process of ion-exchange for the bivalent metal ions is dried by an ordinary known method to make it into a product. The invention is applicable to a wide range of purposes. For example, when the invented zeolite is allowed to have a gas occluded therein under a relatively low pressure, the gas will not be desorbed even when the pressure is brought back to a normal level. Therefore, the gas can be filled at low pressure obviating the necessity of the use of a pressure resistive container, so that the weight of the container can be reduced to facilitate storage and transportation of gas. Particularly, a gas such as radioactive krypton (molecular dia. 4 Å) not only can be handled without difficulty but also the weight thereof can be reduced to a great extent. Further, with the invented zeolite employed, argon the molecule diameter of which is 3.8 Å can be occluded in the same manner as krypton, so that the zeolite is usable also as argon occluding material. Further, since oxygen the molecule dia. of which is 2.8 Å cannot be occluded, argon can be separated from an argon-oxygen mixture gas and can be solely occluded in the zeolite.

Since the occluding material of this invention is capable of occluding not only hydrogen gas but also other gases such as helium gas and acetylene gas, it is usable also for storing them.

The above and further objects, features and advantages of the invention will become apparent from the following detailed description of embodiment examples thereof taken in connection with the accompanying drawings.

DETAILED DESCRIPTION OF PREFERRED EMBODIMENTS

EXAMPLE 1

Figure 1:
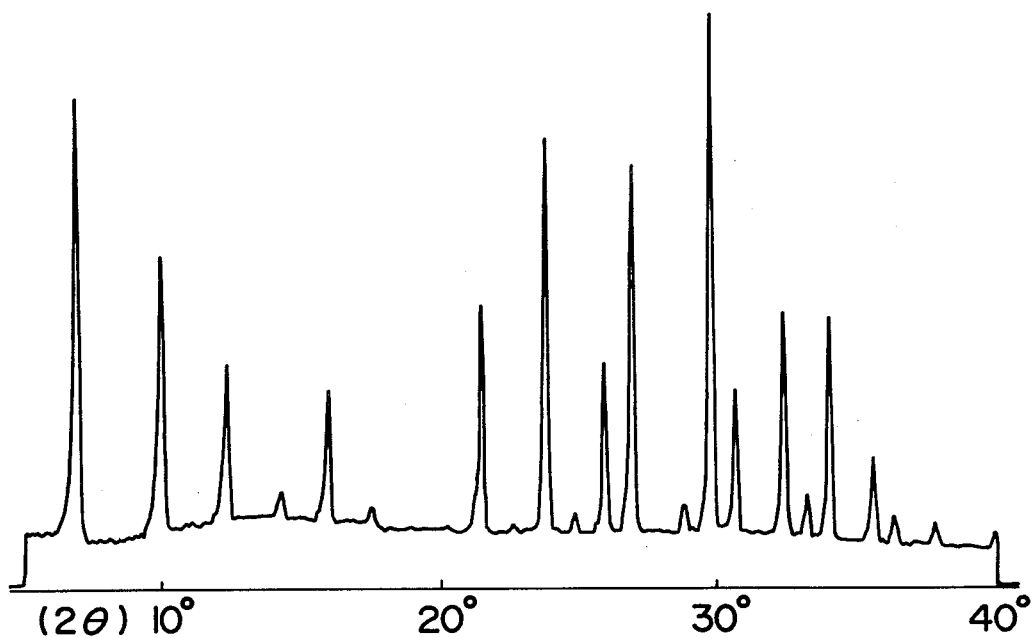
FIG. 1 is an X-ray diffraction graph of Sample 3 obtained in accordance with the embodiment example 1 of the invention.

First, 128 g of a sodium A-type zeolite which adsorbed a saturated amount of water was put in 1 liter of aqueous solution of one normal potassium chloride. They were brought into contact with each other at 80° C. with stirring over a period of 20 hours. Then solid-liquid separation was carried out by filtration. A solid component thus obtained was washed with distilled water. This process was repeated twice. An A-type zeolite which was thus obtained is again put in 2.5 liters of one normal aqueous solution of potassium chloride to bring them into contact at 80° C. with stirring over a period of 20 hours. Solid-liquid separation was effected by filtration. A solid component thus separated was washed with distilled water. This process was repeated five times. An A-type zeolite thus obtained was subjected to a chemical analysis to obtain the following results:

$$K_2O: 22.4 \text{ wt\%} \quad Na_2O < 0.1 \text{ wt\%}$$

A saturating amount of water content was allowed to be adsorbed by the potassium A-type zeolite thus obtained. Then, 12.3 g of the zeolite was put in an Erlenmeyer flask as sample and an aqueous solution of 0.2 normal calcium chloride was also put into the flask for each sample in amount as shown in Table 1. They were brought into contact with each other with stirring over a period of 20 hours at 80° C. Solid-liquid separation was effected by filtration and a solid component thus obtained was washed with distilled water to obtain an A-type zeolite. The zeolite thus obtained was subjected to chemical analysis to find that the zeolite was as shown in Table 1 below:

TABLE 1

| Sample No. | Amount of added aqueous solution of potassium chloride, ml | Composition |
|---|---|---|
| 1 | 79 | $K_{8.76}Ca_{1.62}A$ |
| 2 | 106 | $K_{7.84}Ca_{2.08}A$ |
| 3 | 132 | $K_{6.76}Ca_{2.62}A$ |
| 4 | 179 | $K_{5.08}Ca_{3.46}A$ |
| 5 | 222 | $K_{4.44}Ca_{3.78}A$ |

Each composition shown in Table 1 indicates ratio within the unit cell in respect only to the potassium and calcium contained in the zeolite. Further, in each composition indicated, A represents other framework of zeolite that remained unchanged through ion-exchange. The results of chemical analysis were examined in the same manner as this for subsequent embodiment examples. FIG. 1 is an X-ray (Cu-K$\alpha$) diffraction graph of Sample 3 obtained after it was dried and then allowed to adsorb water content in saturating amount.

EXAMPLE 2

The sample 3 obtained in Example 1 was put in an autoclave of capacity 300 cc. While the inside of the autoclave was being kept in a vacuum state with a vacuum pump, the sample was heated and kept at 300° C. for a period of two hours. Then the sample was cooled down to room temperature. Following this, krypton gas of purity 99.95% was introduced into the autoclave and the autoclave was again heated. The pressure when temperature was raised by heating up to 300° C. was 38 kg/cm$^2$G. Then, the autoclave was left intact for one hour and after the heating was stopped to effect gradual cooling. The period of time required for the gradual cooling from 300° C. down to room temperature was 3 hours. The pressure at the room temperature was 23 kg/cm$^2$G. The krypton gas corresponding to additional pressure was recovered until the pressure comes down to about 0.5 kg/cm$^2$G and the rest thereof was discharged until there obtained atmospheric pressure.

After that, again the autoclave was heated. The gas which was swollen by this heating was collected into a measuring cylinder placed upside-down in a water sealed vessel and the gas volume was measured. Further, without putting any sample, krypton gas of 99.95 purity was alone introduced into the same autoclave up to atmospheric pressure. The autoclave was then heated under the same conditions. The swollen gas which was thus obtained was collected also by the same substitution method and the amount of the gas was measured. The amount obtained by subtracting the gas amount collected with the autoclave in the empty state from the gas amount collected with the sample within the autoclave was amount deencapsulated from the sample. The amount of the deencapsulated gas produced per unit weight of the sample in an activated state at each of various degrees of temperature was obtained as shown below with the volume of the sample, measuring temperature and pressure corrected as necessary:

TABLE 2

| Temperature, °C. | Deencapsulated gas amount (mlSTP/g) |
|---|---|
| 30 | 0 |
| 50 | 16.5 |
| 100 | 33.5 |
| 200 | 37.5 |
| 300 | 40.8 |

EXAMPLE 3

Using the samples 1, 2, 4 and 5 obtained in Example 1, the gas amount deencapsulated from them was obtained in the same manner as in Example 2 to obtain the following results:

TABLE 3

| Temp., °C. | Deencapsulated gas amount, mlSTP/g | | | |
|---|---|---|---|---|
|  | Sample 1 | Sample 2 | Sample 4 | Sample 5 |
| 30 | 0 | 0 | 0 | 0 |
| 50 | 1.9 | 2.7 | 16.1 | 14.7 |
| 100 | 4.4 | 25.4 | 30.1 | 26.5 |
| 200 | 13.7 | 27.6 | 33.1 | 27.2 |
| 300 | 19.1 | 28.4 | 36.8 | 27.6 |

COMPARISON EXAMPLE 1

A sodium-A zeolite was allowed to adsorb water content in saturating amount and 20 g of the zeolite was put in a Erlenmeyer flask. Then, 130 ml of an aqueous solution of 1 normal potassium chloride was put in the flask. They were brought into contact with each other with stirring at 80° C. over a period of 20 hours. Solid-liquid separation was effected by filtration. A solid component thus separated was washed with distilled water to obtain an A-type zeolite. The A-type zeolite was subjected to chemical analysis to find that the product thus obtained was of composition expressed by $K_{5.81}Na_{6.19}A$. The amount of gas deencapsulated from samples of this zeolite was obtained by the same method as in Example 2. The results of this were as shown in Table 4 below:

TABLE 4

| Temperature, °C. | Deencapsulated gas amount, mlSTP/g |
|---|---|
| 30 | 0 |
| 50 | 3.1 |
| 100 | 4.3 |
| 200 | 8.3 |
| 300 | 9.6 |

EXAMPLE 4

The sample 4 obtained in Example 1 was put in an autoclave of capacity 300 cc. While the inside of the autoclave was being kept in a vacuum state with a vacuum pump, the sample was heated and kept at 300° C. for a period of two hours. Then the sample was cooled down to room temperature. Following this, krypton gas of purity 16.95% was introduced into the autoclave and the autoclave was again heated. The pressure was 38 kg/cm$^2$G when temperature was raised by heating up to 300° C. The autoclave was left intact for one hour and then the heating was stopped and followed by a prompt cooling process. The period of time required for cooling from 300° C. down to room temperature was 20 minutes. The pressure at room temperature was 23 kg/cm$^2$G. The krypton gas corresponding to added pressure was recovered until pressure because about 0.5 kg/cm$^2$G and the rest thereof was discharged until there obtained atmospheric pressure. After that, again the autoclave was heated. Then, the gas which was swollen by this heating was collected into a measuring cylinder placed upside-down in a water-sealed vessel and the gas volume was measured. The amount of the deemcapsulated gas prouced per unit weight of the sample while it is in an activated state at each of various degrees of temperature was obtained as shown in Table 5 below with the volume of the sample, measuring temperature and pressure corrected as necessary:

TABLE 5

| Temp., °C. | Deencapsulated gas amount, mlSTP/g |
|---|---|
| 30 | 0 |
| 50 | 26.8 |
| 100 | 32.5 |
| 200 | 33.5 |
| 300 | 33.8 |

EXAMPLE 5

The potassium zeolite which was obtained in Example 1 was allowed to adsorb water content in saturating amount and 12.3 g of the zeolite was put in an Erlenmeyer flask for use as sample. To each sample thus prepared was added 0.2 normal zinc chloride, 0.2 normal cobalt chloride or 0.2 normal manganese chloride, each of these additives being added in amount 158 ml. To bring then into contact with each other, stirring was carried out at 80° C. over a period of 20 hours. Solid-liquid separation was effected by filtration and a solid component thus separated was washed with distilled water to obtain an A-type zeolite. The zeolite samples thus obtained were subjected to chemical analysis to find that the zeolite samples were of compositions as shown in Table 6 below:

TABLE 6

| Sample No. | Composition |
|---|---|
| 6 | $K_{5.58}Zn_{3.21}A$ |
| 7 | $K_{7.08}Co_{2.46}A$ |
| 8 | $K_{6.52}Mn_{2.74}A$ |

The amount of gas deencapsulated from each of the samples 6, 7 and 8 was obtained in the same manner as in Example 2. The results were as shown in Table 7 below:

TABLE 7

| | Deencapsulated gas amount, mlSTP/g | | |
|---|---|---|---|
| Temperature, °C. | Sample 6 | Sample 7 | Sample 8 |
| 30 | 0 | 0 | 0 |
| 50 | 15.3 | 6.3 | 17.6 |
| 100 | 16.2 | 23.7 | 18.3 |
| 200 | 16.8 | 25.1 | 19.3 |
| 300 | 17.6 | 25.6 | 19.6 |

EXAMPLE 6

The sample 3 obtained in Example 1 was put in an autoclave of capacity 300 cc. While the inside of the autoclave was kept in a vacuum state with a vacuum pump, the autoclave was heated and kept at 300° C. for a period of 2 hours. Then, the autoclave was cooled down to room temperature. After that, krypton gas of 99.95% purity was introduced into the autoclave and again the autoclave was heated. The pressure was 18 kg/cm²G when the autoclave was heated up to 300° C. The autoclave was left intact in this state for a period of one hour. Heating was stopped and the autoclave was gradually cooled. The period of time required for cooling from 300° C. down to room temperature was 3 hours. The pressure at room temperature was 10 kg/cm²G. The krypton gas corresponding to added pressure was recovered until pressure became about 0.5 kg/cm²G and the rest was discharged until there obtains atmospheric pressure. Following that, the autoclave was again heated and gas swollen by this heating was collected into a measuring cylinder placed upside-down in a water-sealed vessel and the volume of the gas was measured. Then, the amount of gas desorbed from the zeolite was obtained by the same method as in Example 2 to obtain results of this as shown in Table 8 below:

TABLE 8

| Temp., °C. | Deencapsulated gas amount mlSTP/g |
|---|---|
| 30 | 0 |
| 50 | 5.9 |
| 100 | 14.4 |
| 200 | 15.4 |
| 300 | 15.6 |

EXAMPLE 7

The sample 3 obtained in Example 1 was put in an autoclave of capacity 300 cc. While the inside of the autoclave was being kept in a vacuum state with a vacuum pump, the autoclave was heated and kept at 300° C. for a period of 2 hours. Then, the autoclave was cooled down to room temperature. After that, krypton gas of 99.95% purity was introduced into the autoclave and again the autoclave was heated. The pressure was 38 kg/cm²G when the autoclave was heated up to 150° C. The autoclave was left in this state for a period of one hour. Heating was then stopped and the autoclave was gradually cooled. The length of time required for cooling the autoclave from 300° C. down to room temperature was 3 hours. Pressure at room temperature was 27 kg/cm²G. The krypton gas corresponding to added pressure was recovered until pressure became about 0.5 kg/cm²G and the rest of the gas was discharged until there obtains atmospheric pressure. Following this, the autoclave was again heated and the gas swollen by the heating was collected into a measuring cylinder placed upside-down in a water-sealed vessel. The volume of gas was measured. Then, the amount of gas desorbed from the zeolite was obtained by the same method as in Example 2 to obtain results of this as shown in Table 9 below:

TABLE 9

| Temp., °C. | Deencapsulated gas amount, mlSTP/g |
|---|---|
| 30 | 0 |
| 50 | 3.9 |
| 100 | 24.2 |
| 200 | 26.4 |
| 300 | 27.1 |

What is claimed is:

1. A method for occluding krypton comprising contacting krypton, at a temperature of 300° C. or lower and a pressure of 38 kg/cm²G or lower, with a zeolite having an effective pore absorption diameter less than the diameter of the krypton molecule, said zeolite having a composition expressed by a typical unit cell:

$(K_xM_yNa_z)(AlO_2.SiO_2)_{12}.(NaAlO_2)\delta.\omega H_2O$, wherein M represents a divalent metal, $0<\delta<1$, $\omega$ represents a positive number and x, y and z, which respectively represent in said unit cell the numbers of potassium, the divalent metal and sodium, have the following relation:

$$x+2y+z=12$$

$$3 \leq x < 10$$

$$1 < y \leq 4.5,$$

said divalent cations being substantially present at sites other than 8-member rings of said zeolite, whereby said krypton is encapsulated and occluded in said zeolite.

2. A method for occluding krypton as set forth in claim 1, wherein the contacting is performed at a pressure of 38 Kg/cm$^2$G at 150° C. or lower.

* * * * *